Dec. 26, 1922.　　　　　　　　　　　　　　　　　1,439,721
E. ZAHM.
APPARATUS FOR FILTERING GAS CONTAINING BEVERAGES.
FILED MAY 16, 1919.
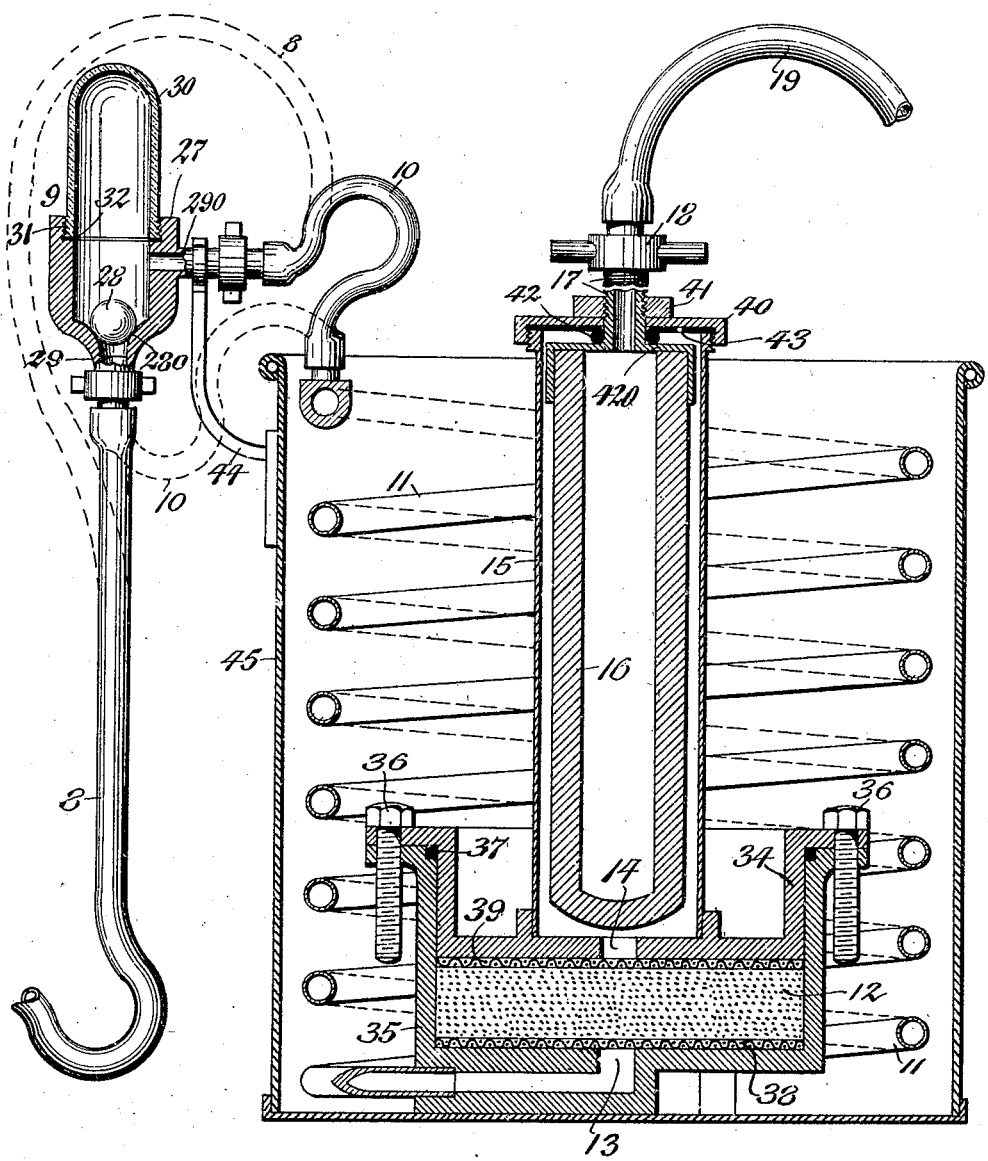
INVENTOR
Edward Zahm
BY
ATTORNEYS Patented Dec. 26, 1922.

1,439,721

UNITED STATES PATENT OFFICE.

EDWARD ZAHM, OF BUFFALO, NEW YORK.

APPARATUS FOR FILTERING GAS-CONTAINING BEVERAGES.

Application filed May 16, 1919. Serial No. 297,545.

*To all whom it may concern:*

Be it known that I, EDWARD ZAHM, a citizen of the United States, residing in Buffalo, in the county of Erie and State of New York, have invented new and useful Improvements in Apparatus for Filtering Gas-Containing Beverages, of which the following is a specification.

This invention relates to a filter for use in connection with the production of gas containing beverages such as low alcoholic beer, root beer, birch beer, cider, etc., and the production of carbonic acid gas in the same by a partial fermentation of the sugars of which the beverage is partially composed.

The object of my invention is to provide a filter which renders it possible to produce gas containing beverages of low alcoholic content without carbonating the beverage as is usually the practice, and without refrigeration during the process of fermentation.

Furthermore it is the object of my invention to provide a filter which will prevent after-fermentation of the beverage to avoid the formation of more alcohol than the beverage is made to contain.

Beverages having the proper quantity of gas to make them palatable contain about four tenths of one per cent carbonic acid gas and since during fermentation equal parts of alcohol and carbonic acid gas are produced, a beverage which is fermented until four thenths of one per cent alcohol are produced will contain sufficient carbonic acid gas to make the beverage palatable.

The finishing process to which the thus partially fermented beverage is subjected consists in cooling the beverage and filtering the cooled beverage to sterility so that further fermentation is avoided. This finishing process also frees the beverage from yeasts and other mechanically suspended matter thus giving the beverage a clean taste as well as a brilliantly clear appearance.

The amount of gas contained in a beverage exerts a pressure therein which varies with the quantity of gas and the temperature of the beverage. A beverage containing sufficient gas to make the same palatable exerts at 70 degrees F. about twenty-five pounds pressure and this is taken as a basis for determining the point at which sufficient gas has been produced.

The accompanying drawing shows an apparatus suitable to carry out my process.

This drawing is a vertical section, showing one form of the liquid filter and cooler and adjacent parts embodying my invention.

The material to be filtered is supplied by a hose 8 from any suitable source to which it is connected at one end. The hose 8 is attached at its other end to the check valve 9 which latter in turn is connected by the hose or conduit 10 to the upper end of the cooling coil 11, the lower end of the cooling coil being attached to the inlet 13 on the underside of the chamber or body 35 of a pulp filter. 14 is the outlet on the upper side of the pulp filter chamber leading to the upright shell or tube 15 which is arranged above the chamber 35 and houses the porous upright filtering cylinder 16 of the type used in the process of filtering beer to sterility. 17 is the discharge neck or throat of the filtering cylinder which is connected by means of the coupling 18 and the hose or conduit 19 to any suitable storage place.

The body of the check valve 9 preferably comprises a lower base 27 of metal and an upper dome 30 of transparent material which together form the chamber of this valve. The metal base 27 is provided with a lower nozzle 29 connected with the hose 8, an upper lateral nozzle 290 which is connected with the hose 10 and an internal valve seat 280 within the nozzle 29. A ball shaped float valve or stopper 28 is arranged within the chamber of the valve 9 and engages the seat 280 for checking the flow through this valve from above. The dome 30 is preferably made of glass and permits the position of the float ball to be seen. The dome 30 is attached to the base 27 by means of a screw joint 31, a gasket 32 or by other suitable packing means, being preferably interposed between the same.

The filter chamber or body 35 contains the mass or layer of pulp 12 in its lower part and into its upper part is slidingly fitted a cover 34 which is constructed to act as a plunger to compress the filter pulp when drawn down by the cap screws 36 or the like, the compression being sufficient when the proper quantity of filter pulp has been compressed so that a joint is made between the body and cover of the pulp filter by the gasket 37 between the same. 38 and 39 are screens of suitable construction arranged below and above the pulp mass to distribute the beverage to be filtered over the inlet side of the filter pulp and to conduct the pulp filtered beverage from the outlet side of the pulp filter to the discharge opening 14 and also to prevent particles of filter pulp from being carried through this opening.

The filtering cylinder 16 is attached to the cover 40 of the tube 15 by means of the nut 41 which is applied to the upper outlet neck 17 of this tube and bears against the upper side of this cover. A gasket 42 is interposed between the cover and the shoulder or breast 420 on the inner end of the neck and another gasket 43 is interposed between this cover and the upper end of the tube 15. The check valve 9 is mounted on a bracket 44 which is attached to the side of the tube 45 so that the body of the valve is rotatable in a vertical plane about the joint between the base 27 and the bracket, the latter preferably connected by a rotatable joint with the upper horizontal nozzle 290 of the metal base 27.

Prior to starting the filtering apparatus must be prepared for use in the following manner. The capscrews 36 are removed and the filter top 34 withdrawn by grasping the tube 15. The screen 38 is inserted and a charge of filter pulp introduced above it. The screen 39 is then inserted above the filter pulp, the cover 34 replaced and drawn down by means of the screws 36 until a tight joint is made by the gasket 37. To expedite the flow of the beverage a higher pressure may be applied thereto by means of a pump. By thus bringing about a more rapid flow of the beverage it shortens the time required to pass the beverage through the filter and reduces the generation of carbonic acid gas in excess of the amount required by the beverage.

Where a supply of compressed air is available the same may be used at the check valves 4 and 26 and may be left attached to hose 8 during the filtering stage of the process, the pressure being controlled by a regulator of any suitable construction placed in the air supply line. In this event the hose 8 and the hose 10 may be interchanged in their connection to the check valve 9, as shown by dotted lines in the drawing the check valve tilted momentarily to fill the dome with the flowing beverage which permits the check ball 28 to float.

The function of the cooling coil 11 and the reason for immersing the same together with the pulp filter 12 and the tube 15 in a cooling medium, is to reduce the temperature of the beverage before and while flowing through the filters to bring the carbonic acid gas contained in the beverage below the point of saturation at the pressure under which the beverage flows into the place of storage.

I claim as my invention:

1. A filter including a hollow body having an inlet, a cover removably secured to said body, screens arranged at the top and bottom of said body, a filling of pulp arranged in said body between said screens, a filter shell connected at its lower end with said cover and communicating with the inner side of said filter body, and a porous filter tube arranged in said shell and having an outlet.

2. A filter including a hollow body having an inlet, a cover removably secured to said body, screens arranged at the top and bottom of said body, a filling of pulp arranged in said body between said screens, a filter shell connected at its lower end with said cover and communicating with the inner side of said filter body, a porous filter tube arranged in said shell and having an outlet, and a tub receiving said filtering devices and adapted to contain a refrigerating medium.

3. A filter including a hollow body having an inlet, a cover removably secured to said body, screens arranged at the top and bottom of said body, a filling of pulp arranged in said body between said screens, a filter shell connected at its lower end with said cover and communicating with the inner side of said filter body, a porous filter tube arranged in said shell and having an outlet, a coil surrounding said filtering devices and connected at its lower end with the interior of said filter body and at its upper end with the means which supply the material to be filtered, a tub which receives said filtering devices and coil and which is adapted to contain a refrigerating medium.

EDWARD ZAHM.